(12) United States Patent
Fan et al.

(10) Patent No.: US 10,005,007 B2
(45) Date of Patent: Jun. 26, 2018

(54) BIODIESEL-BASED EMULSION DEFOAMER AND METHOD FOR MAKING THE SAME

(71) Applicant: ECOLAB USA INC., St. Paul, MN (US)

(72) Inventors: Yanru Fan, Shanghai (CN); Yulin Zhao, Shanghai (CN)

(73) Assignee: ECOLAB USA INC., St. Paul, MN (US)

( * ) Notice: Subject to any disclaimer, the term of this patent is extended or adjusted under 35 U.S.C. 154(b) by 160 days.

(21) Appl. No.: 14/786,501

(22) PCT Filed: Apr. 23, 2014

(86) PCT No.: PCT/US2014/035091
§ 371 (c)(1),
(2) Date: Oct. 22, 2015

(87) PCT Pub. No.: WO2014/179127
PCT Pub. Date: Nov. 6, 2014

(65) Prior Publication Data
US 2016/0107103 A1   Apr. 21, 2016

(30) Foreign Application Priority Data

Apr. 28, 2013   (CN) .......................... 2013 1 0156297

(51) Int. Cl.
*B01D 19/04* (2006.01)
*D21H 21/12* (2006.01)
*D21H 17/00* (2006.01)

(52) U.S. Cl.
CPC ......... *B01D 19/0404* (2013.01); *D21H 17/74* (2013.01); *D21H 21/12* (2013.01)

(58) Field of Classification Search
CPC .... B01D 19/0404; B01D 19/02; B01D 19/04; B01D 19/0409; B01D 19/0413; D21H 17/74; D21H 21/12
(Continued)

(56) References Cited

U.S. PATENT DOCUMENTS 2,715,614 A * 8/1955 Snook .................... D21H 21/12
159/DIG. 4
4,477,371 A   10/1984 Huber et al.
(Continued)

FOREIGN PATENT DOCUMENTS

AR         056443 A1   10/2007
CN       101158131 A    4/2008
(Continued)

OTHER PUBLICATIONS

Rhodoline® 622, Product Data Sheet N001028—Jun. 2009, Rhodia, La Défense, France, p. 1 of 1 (Jun. 2009).*
(Continued)

*Primary Examiner* — Daniel S Metzmaier
(74) *Attorney, Agent, or Firm* — Eric D. Babych; Brinks Gilson & Lione (57) ABSTRACT

Disclosed are an oil-in-water emulsion defoamer and a method for preparing the defoamer. The defoamer may have a dispersed oil phase with a droplet size of 4 to 8 μm, and a viscosity of 100 to 1000 cP, and is widely used for defoaming in paper coating and wet-end in a paper mill. A method for preparing an oil-in-water emulsion defoamer is also provided. The method may include adding an emulsifying agent to biodiesel, and mixing, then gradually adding hydrophobic fumed silica to obtain a first mixture. The method may also include gradually adding water and a non-ionic surfactant, and stirring until uniform to obtain a second mixture. The method may also include gradually
(Continued)

adding the first mixture to the second mixture, and stirring until uniform, to obtain an oil-in-water emulsion defoamer.

17 Claims, 3 Drawing Sheets

(58) Field of Classification Search
USPC ............ 516/72, 73, 115, 116, 121, 132, 133
See application file for complete search history.

(56) References Cited

U.S. PATENT DOCUMENTS

| | | | |
|---|---|---|---|
| 4,988,463 A * | 1/1991 | Walz | B01D 19/0404 516/131 |
| 5,431,853 A | 7/1995 | Tsuda et al. | |
| 6,521,587 B1 | 2/2003 | L'Hostis et al. | |
| 7,879,917 B2 * | 2/2011 | Cheng | B01D 19/0404 162/158 |
| 7,893,115 B2 | 2/2011 | Cheng et al. | |
| 8,536,257 B2 * | 9/2013 | Shah | B01D 19/0404 524/122 |
| 2006/0128816 A1 | 6/2006 | Cheng et al. | |
| 2006/0128884 A1 * | 6/2006 | Cheng | B01D 19/0404 524/588 |
| 2009/0010864 A1 * | 1/2009 | Banowski | A61K 8/06 424/65 |
| 2011/0003923 A1 * | 1/2011 | Shah | B01D 19/0404 524/287 |
| 2011/0213053 A1 | 9/2011 | Wu et al. | |
| 2015/0080273 A1 * | 3/2015 | Hatchman | B01D 19/0404 507/219 |

FOREIGN PATENT DOCUMENTS

| | | |
|---|---|---|
| CN | 101638871 A | 2/2010 |
| DE | 10 2010 048 948 A1 | 12/2011 |
| JP | S 5955318 A | 3/1984 |
| JP | 59147608 A | 8/1984 |
| JP | H 0639207 A | 2/1994 |
| JP | 2003230804 A | 8/2003 |
| JP | 2008291116 A | 12/2008 |
| JP | 2011506086 A | 3/2011 |
| JP | 2011514249 A | 5/2011 |
| WO | WO 2006/063235 A1 | 6/2006 |
| WO | WO 2008/043512 A2 | 4/2008 |
| WO | WO 2009/080428 A1 | 7/2009 |
| WO | WO 2009/106252 A1 | 9/2009 |

OTHER PUBLICATIONS

Milton J. Rosen, Surfactants and Interfacial Phenomena, Third Edition, Chapter 4, John Wiley & Sons, Inc., Publication, Hoboken, New Jersey, USA, (©2004) pp. 178-207.*
International Search Report for International Patent Application No. PCT/US2014/035091, dated Aug. 27, 2014 (5 pages).

* cited by examiner

BIODIESEL-BASED EMULSION DEFOAMER AND METHOD FOR MAKING THE SAME

TECHNICAL FIELD

The present invention relates to a defoamer for use in paper industry, and more particularly, to an oil-in-water (O/W) emulsion defoamer and a preparation method thereof; the defoamer emulsion has biodiesel as an oil phase, has good antifoaming and defoaming performances, and is more stable, being suitable for defoaming in paper coatings and wet-end in a paper mill.

BACKGROUND

Defoamers are chemical additives widely used in pulping and paper industry, and have two main functions including defoaming and antifoaming Depending on the carrier used therein, the defoamers are classified as oil-based defoamers and water-based defoamers. The oil-based defoamer has an active ingredient emulsified or dispersed in a hydrocarbon carrier.

The oil-based defoamer emulsion is generally prepared using petroleum products, for example, organic hydrocarbons such as paraffin, diesel, mineral oil, and the like. Generally, the oil-based defoamer emulsion may undergo break-up, i.e. demulsification, during storage, and the demulsified defoamer will suffer from low effectiveness or even be ineffective; consequently, an amount of thickener is frequently required to be added in the oil-based defoamer, to increase the stability of the defoamer.

In addition, with the implementation of regulations with respect to related food and environmental safety, in the additives, including the defoamer, used in the paper industry, the content of harmful residual ingredients of organic hydrocarbons, such as aromatic hydrocarbons, is strictly limited, and thus, alternative production is carried out using mineral oils with an extremely high purity in the industry. However, the mineral oil is expensive, so inexpensive alternatives or defoamer formulations are sought to meet the requirements in terms of production and safety.

Argentina Patent Application AR056443 discloses a defoamer which has a fatty acid methyl ester (main ingredient of biodiesel) prepared from vegetable oils as a main component, and some inorganic particles, a thickener, a solvent, and other functional ingredients are also contained in the formulation. The introduction of biodiesel into the field of defoamer creates a new research subject; however, besides the contents described above, in the patent application, no contents regarding other specific components, component ratio, and preparation method of the defoamer are disclosed; the specific composition and preparation method of this defoamer cannot be acquired by those skilled in the art through the limited content disclosed in the literature.

Chinese Patent Application CN 101638871 A also discloses a new defoamer which has biodiesel introduced therein and includes a fatty acid methyl ester derivative as a component of the composition of the defoamer, in which the fatty acid methyl ester derivative is formed through an additive reaction of ethylene oxide and/or propylene oxide in the presence of a catalyst; furthermore, other active ingredients such as polyethers and natural oils are also added in the formulation of the defoamer. However, in the technical solution, the biodiesel is required to be chemically modified, which thus leads to a complex process for chemical treatment; moreover, a large amount of surfactant polyethers is contained in such defoamers, which may result in a negative influence on the sizing process during paper making.

The defoamer emulsion is typically difficult to be prepared and stored; for a successful defoamer formulation, both essential antifoaming and defoaming functions, and good product stability are required. There are various defoamer formulations in the prior art, which are mainly differentiated by the selection of the components of the defoamer, the contents of individual components, the performances of and the interaction between the components, and the preparation methods which are also of great importance.

The present inventor finds, through extensive tests and studies, a new formulation of an oil-in-water emulsion defoamer; the oil-in-water emulsion defoamer is formed using particular components and preparation method, with biodiesel as a defoaming active ingredient to completely replace the conventional organic hydrocarbons as the oil phase, so as to meet the food safety standards; the oil-in-water emulsion defoamer thus obtained has excellent stability and is not easy to break-up during storage, while having good antifoaming and defoaming performances.

CONTENTS OF THE INVENTION

An oil-in-water emulsion defoamer having good antifoaming and defoaming performances and being more stable is disclosed in the present invention, which is prepared with biodiesel as a raw material, and is useful for defoaming in paper coating and wet-end in a paper mill; the oil-in-water emulsion defoamer meets the common national food safety standards, is environmentally friendly, and also has better storage stability and defoaming performance compared with the conventional defoamers.

In an aspect, the present invention provides a method for preparing an oil-in-water emulsion defoamer, said method comprising the steps of (i) adding 0.2 to 6 weight parts of an emulsifying agent to 30 to 60 weight parts of biodiesel, and mixing, then gradually adding 0.5 to 3 weight parts of hydrophobic fumed silica, and thoroughly stirring to disperse said silica, to obtain a mixture A;

(ii) gradually adding 10 to 50 weight parts of water to 5 to 30 weight parts of a non-ionic surfactant, and stirring until uniform at a stirring rate adjusted according to the variation of the viscosity of the resulting mixture, to obtain a mixture B, in which said non-ionic surfactant has a cloud point of below 50° C.; and then (iii) gradually adding the mixture A to the mixture B, and stirring until uniform, to obtain said oil-in-water emulsion defoamer.

In another aspect, the present invention provides an oil-in-water emulsion defoamer prepared according to the method of the present invention; said defoamer has an dispersed oil phase with a droplet size of 4 to 8 μm, and a viscosity of 100 to 1000 cP, and can be widely used for defoaming in paper coating and wet-end in a paper mill.

In yet another aspect, the present invention provides a method for antifoaming or deforming in a paper coating and a paper making system, which comprises adding an oil-in-water emulsion defoamer prepared according to the method of the present invention to the paper coating and the paper making system.

It is demonstrated by the present inventor through numerous tests that in the present invention, the selection of individual components, and the combination manner and mixing order thereof is extremely important for forming the oil-in-water emulsion defoamer of the present invention; depending on various combination manners and mixing orders of the individual components, completely different final morphologies may be caused to the resulting defoamer, and the degree of retained activity and the storage time of the defoamer emulsion are also crucially influenced.

The oil-in-water emulsion defoamer prepared by the method of the present invention has the following advantages:

The renewable resource biodiesel is employed as the oil phase of the defoamer, which can be easily degraded in the natural environment, thus being environmentally friendly; and which meets the requirements of regulations with respect to food safety to a higher extent than organic hydrocarbons and other materials, and is inexpensive.

The oil-in-water emulsion defoamer prepared by the method of the present invention has not only good defoaming and antifoaming performances, but also excellent stability compared with the conventional emulsion defoamer, and thus can be stored for a long period of time without demulsification.

The method of the present invention is simple in operation, and does not require particular emulsifying equipment, which reduces production investment.

A variety of embodiments of the present invention will be described in detail with reference to accompanying drawings, in which the similar drawing reference signs refer to the similar parts throughout the drawings. The disclosure of the variety of embodiments is not intended to limit the protective scope of the present invention. The appended drawings of the specification of the present invention are merely provided for exemplary illustration of the present invention, instead of limiting the implementation of the present invention.

PARTICULAR EMBODIMENT

The embodiments of the present invention are not restricted to particular methods for preparing the defoamer, and can be correspondingly modified as appreciated by those skilled in the art. It should be further understood that the terms used herein are all for the purpose of describing the particular embodiments merely, and not intended for limitation in any way or to any extent. Unless otherwise defined, all the scientific and technical terms used herein have the same meaning as those generally appreciated by those ordinarily skilled in the art that the embodiments of the present invention fall within. Similar to the methods and materials mentioned herein, those modified therefrom or equivalent thereto can be used to implement the embodiments of the present invention without undue experiments.

The numerical ranges described in the description include the numerical values defining such ranges. The term "about" used in the present invention is for defining a numerical value modified by it, by expressing the value as a variable within an error range, or indicating the possible variation of the value. The equivalents of the values are included in the claims, whether the values are modified by the term "about".

According to an embodiment of the present invention, biodiesel is used as the oil phase, and a stable oil-in-water emulsion is formed by adding a polyethylene glycol fatty acid ester, a small amount of hydrophobic fumed silica, and an emulsifying agent. The biodiesel can be used as an oil phase in place of the conventional organic hydrocarbons to prepare an emulsion product. Biodiesel is a renewable resource, and can be easily degraded in the natural environment, thus reducing environmental pollution. In contrast, the organic hydrocarbon oils lack all of these features.

Biodiesel

Biodiesel is converted from vegetable oils, animal oils, waste oils, or microbial oils. The main sources of the raw material of biodiesel include soybean, rape and other vegetable oils, and animal oils including animal fat by-product produced during livestock production and processing, as well as engineered microalgae and waste edible oil.

The biodiesel used in the present invention may be a mixture containing a fatty acid methyl ester or a fatty acid ethyl ester respectively, or a mixture containing a fatty acid methyl ester and a fatty acid ethyl ester.

In an embodiment of the present invention, the biodiesel is a mixture containing a fatty acid methyl ester, a fatty acid ethyl ester, or both, with the content of the active ingredient being about 90% or above, and preferably about 95% or above, and the flash point being about 100° C. or above, and preferably about 120° C. or above.

Flash point refers to the lowest temperature at which a liquid can release a sufficient amount of vapour in a test container, to form, near the surface of the liquid, an ignitable mixture in air, and can be determined by a suitable method. Here, reference may be made to the description in In the present invention, the biodiesel may be prepared through transesterification, including acid or base catalysis, bioenzymatic method, engineered microalgae method or super-critical methanol method. Generally, biodiesel is obtained through transesterification of various animal and vegetable oils with lower alcohols, for example C1-C5 fatty alcohols, such as methanol or ethanol, in the presence of a catalyst, in which methanol is more frequently used due to the low cost. Accordingly, in most of the biodiesels, the principal ingredient is a fatty acid methyl ester, or a mixture of a fatty acid methyl ester and a fatty acid ethyl ester. These are known to persons of skill in the art.

In the present invention, the biodiesel may also be commercially available, for example, domestic biodiesel available from, for example, China National Offshore Oil Corporation (CNOOC) and Zhejiang Oil Chemical Engineering Co., Ltd., and imported biodiesel, for example Soybiodiesel® B100 manufactured by National Biodiesel Ltd., and Bio-diesel manufactured by Australian Rene Company.

Biodiesel has the advantages of being renewable, clean, and safe. Biodiesel has excellent environmental protection behavior, because it firstly is free of aromatic hydrocarbons that may causes pollution to the environment, secondly has good lubrication performance, and thirdly has high safety since it has a high flash point and is not a hazardous product.

In the present invention, biodiesel is employed to prepare the defoamer, which is a renewable resource, can be easily degraded in the natural environment, contains no harmful substance such as aromatic hydrocarbons, and is environmentally friendly, thus meeting, to a higher extent, the requirements of regulations respect to related food safety. In addition, the biodiesel is inexpensive compared with the organic hydrocarbon products derived from petroleum, and thus the product prepared therefrom has a high performance-price ratio.

Emulsifying Agent

In the present invention, the emulsifying agent may be a non-ionic, an anionic, or a cationic surfactant, which may be used alone or in admixture. A suitable emulsifying agent or a combination of different emulsifying agents may be selected by those skilled in the art, for use in the present invention.

In a preferred embodiment of the present invention, the emulsifying agent has a hydrophilic-lipophilic balance (HLB) value of 8 to 18, and preferably 10 to 13; the use of an emulsifying agent within such a preferred range can afford a defoamer having the best emulsifying effect, and exhibiting a good stability at various temperatures and in various stress tests.

Hydrophilic-lipophilic balance (HLB) value is a ratio at balance between two opposite trends of the groups existing in the surfactant molecules, that is, a ratio at balance between hydrophilicity (the moiety having affinity for water) and lipophilicity (the moiety having affinity for oil). The HLB value rises with increasing hydrophilic groups. When having an HLB value of 8 to 18, the surfactant may be used as an emulsifying agent for an oil-in-water emulsion.

In the present invention, the equation for calculating the HLB value of a non-ionic surfactant is:

$$HLB = \frac{\text{Mass of hydrophilic groups}}{\text{Total mass of surfactant}} \times 20$$

The HLB value of an ionic surfactant may be calculated by Davis Formula:

HLB=7+Σcontribution of hydrophilic groups−Σcontribution of lipophilic groups.

The contributions of various common hydrophilic groups and lipophilic groups can be found in the literatures.

If two or more emulsifying agents are used, the total HLB value is the sum of the HLB value of each surfactant multiplied by the mass fraction thereof.

In an embodiment of the present invention, the emulsifying agent is preferably a non-ionic surfactant; more preferably, in the present invention, the emulsifying agent is one or any combination of two or more selected from a fatty alcoholpolyoxyethylene ether, an alkyl phenyl polyoxyethylene ether, an ethoxylated fatty acid amide, a sorbitan fatty acid ester, and an ethoxylated sorbitol fatty acid ester.

In a specific embodiment, said emulsifying agent is preferably a mixture of a sorbitan fatty acid ester and an ethoxylated sorbitol fatty acid ester, and the emulsifying agent is more preferably a mixture of sorbitan monooleate (Span 60) and sorbitan monooleatepolyoxyethylene ether (Tween 60) mixed at a suitable proportion to achieve a desired HLB value.

Emulsifying agent is an essential ingredient of the emulsion type defoamer, which facilitates the uniform dispersion of the defoamer components in the emulsion system, thereby maintaining the stability of the defoamer during storage and transportation, while not affecting the compatibility of the defoamer with the pulp furnish Hydrophobic Fumed Silica Hydrophobic silica is obtained through surface treatment of inorganic silica with an organosilane compound (a hydrophobic modifier), and is generally classified as hydrophobic fumed silica and precipitated silica depending on the production process. The hydrophobic fumed silica powder may be obtained through surface chemical treatment of hydrophilic fumed silica powder with silane at a high temperature of 200-400° C., in which the commonly used chemical process is a fluidized bed process.

The hydrophobic fumed silica may also be commercially available, for example, the products AEROSIL® R972, R974, R104, R106, R202, R812, R812S, R816, R7200, R8200, R711, R719, and so on from Evonik Degussa Co., Ltd.

In an embodiment of the present invention, the hydrophobic fumed silica has a specific surface area ranging from 200 to 300 m$^2$/g. Generally, the hydrophobic fumed silica with such a specific surface area has a higher interfacial activity and anti-settling performance, and can contribute to the emulsification and dispersion of the emulsion and the maintenance of emulsion stability.

In the present invention, the hydrophobic silica mainly functions to improve the fluid viscosity of the biodiesel oil phase, and is also used as an antifoam/defoam promoter. The hydrophobic silica should be used in a suitable amount, and overdosage of hydrophobic silica can cause phase separation of resulted emulsion which influences the defoaming performance, and increases the production cost.

Non-ionic Surfactant

In the present invention, the non-ionic surfactant used in Step (ii) has low surface tension, rapid spreadability over an interface, and a cloud point of about 50° C. or below. In the present invention, the non-ionic surfactant is preferably one or more selected from a polyethylene glycol fatty acid ester, a polyethylene glycol tall oil acid ester, a polyether polyol, and a fatty alcohol polyether.

The polyethylene glycol fatty acid ester is prepared through two common methods; one is esterification of polyethylene glycol with an fatty acid, and the other is ethoxylation of ethylene oxide with an fatty acid.

In the present invention, the used polyethylene glycol fatty acid ester is preferably a polyethylene glycol (400) fatty acid ester, a polyethylene glycol (600) fatty acid ester, or a mixture thereof at any ratio. In the polyethylene glycol fatty acid ester, the fatty acid may be a saturated or unsaturated fatty acid having 12 to 18 carbon atoms, and preferably oleic acid, that is, a mono unsaturated fatty acid. The formed fatty acid ester may has a structure of a mono- or di-ester, or a mixture thereof, with the di-ester structure being preferred.

In the present invention, the polyethylene glycol fatty acid ester can be self-emulsified, and has low surface tension, and rapid interfacial spreadability, which is in favor of the removal of micro-bubbles. Alternative chemicals include a polyethylene glycol tall oil acid ester, a polyether polyol, a fatty alcohol polyether, and the like.

The polyethylene glycol tall oil acid ester is produced by esterification of polyethylene glycol with tall oil acid. Tall oil acid is a by-product from the chemical pulping process, and the principal ingredients are fatty acids and resin acids extracted from trees. The polyethylene glycol moiety may be polyethylene glycol of different molecular weights, and preferably polyethylene glycol 400 or polyethylene glycol 600.

Said polyether polyol is an ethylene oxide-propylene oxide polymer prepared with a polyhyhydric compound such as glycerol, ethylene glycol, propylene glycol, pentaerythritol, and sorbitol as an initiator, in which the addition amount of ethylene oxide accounts for 10 to 40% of the total weight of the polyether polyol.

Said fatty alcohol polyether is an addition product of a C10-C16 fatty alcohol with ethylene oxide or a mixture of ethylene oxide and propylene oxide.

Auxiliary

In the present invention, a suitable auxiliary may be added to the defoamer emulsion, which may be one or more selected from an defoam promoter, an antimicrobial agent, a thickener, and a pH modifier, and the total content of the auxiliary is in the range of 0.01% to 2% based on the total weight of the defoamer.

Said defoam promoter is one or more selected from a polyether modified polydimethylsiloxane, a polyether polyol, or a short-chain fatty alcohol. The polyether modified polydimethylsiloxane preferably has a cloud point ranging from 20° C. to 50° C., and a viscosity of 3400 cP or below. The polyether polyol is an ethylene oxide-propylene oxide polymer prepared with a polyhyhydric compound such as glycerol, ethylene glycol, propylene glycol, pentaerythritol, and sorbitol as an initiator. The fatty alcohol is preferably a linear or branched fatty alcohol having 8 to 16 carbon atoms.

In the present invention, the defoamer emulsion has a quite good defoaming performance, and the total content of the defoam promoter and other auxiliaries is in the range of about 0.01 to 2%, as described above. In the present invention, the defoam promoter mainly functions to promote or enhance the activity of the principal ingredients in the defoamer, thereby increasing the defoaming performance and improving the stability of the deformer product.

The antimicrobial agent generally comprises a preservative and a bactericidal agent, which can be optionally selected by those skilled in the art based on the storage environment and the specific ingredients of the defoamer emulsion. The preservative refers to a substance which can prevent and slow down the spoilage of organic matters, for example, prevention of emulsion spoilage, emulsion aggregation, protein denaturization, starch fermentation, and so on. Examples of the preservative include, but are not limited to, 2-hydroxybiphenyl, sorbic acid and a salt thereof, benzoic acid and a salt thereof, benzaldehyde, p-hydroxybenzaldehyde, p-nitrophenol, p-hydroxybenzoic acid and an ester compound thereof, for example, methyl p-hydroxybenzoate, ethyl p-hydroxybenzoate, propyl p-hydroxybenzoate, isopropyl p-hydroxybenzoate, butyl p-hydroxybenzoate, isobutyl p-hydroxybenzoate and the like, and other preservatives that may be used in paper industry. The bactericidal agent refers to a substance which can effectively kill microorganisms or inhibit the microbial growth and reproduction. Examples of the bactericidal agent include, but are not limited to, a quaternary ammonium salt type bactericidal agent, for example, dodecyl dimethyl benzyl ammonium chloride, tetradecyl dimethyl benzyl ammonium chloride, and polyquaternium; a chloride type bactericidal agent, for example, chlorine, chlorine dioxide, sodium dichloroisocyanurate, and sodium trichloroisocyanurate; a peroxide type bactericidal agent, for example, hydrogen peroxide, and peracetic acid; an azoline type bactericidal agent, for example, isothiazolinone and benzoisothiazolinone; an aldehyde type bactericidal agent, for example, glutaraldehyde, etc., and other bactericidal agents that may be used in paper industry.

The thickener is a rheological auxiliary, which can improve the viscosity of the defoamer product, has an emulsifying or suspending effect, and can contribute to the stability of the defoamer emulsion. Examples of the thickener include, but are not limited to, an inorganic thickener, a cellulose ether type thickener, a natural polymer type thickener, for example, starch, gelatin, agar, and a synthetic polymer type thickener, for example, polyacrylamide, polyvinyl alcohol, polyvinyl pyrrolidone, polyoxyethylene, Kaposi resin, polyacrylic acid, sodium polyacrylate, polyacrylate copolymer emulsion, polybutadiene rubber, styrene-butadiene rubber, polyurethane, modified polyurea, and low molecular weight polyethylene wax.

The pH modifier is used for adjusting the pH value of the defoamer emulsion, and examples of the pH modifier include an organic acid, and an inorganic acid, for example, acetic acid, citric acid, and hydrochloric acid, and also strong and weak bases, for example, sodium hydroxide, potassium hydroxide, sodium carbonate, and potassium carbonate. A suitable pH modifier can be selected by persons skilled in the art based on specific implementation situations.

The pH value of the defoamer emulsion is generally controlled in the range of 6.5-8.0, since an excessively high acidity or alkality will affect the quality of the pulp furnish, and causes some corrosion to the equipment of the pulp system.

These auxiliaries may be added as desired by practical production. In addition, it should be understood by those skilled in the art that if needed, other auxiliaries may also be added, to attain corresponding performances; however, whichever auxiliary(ies) is (are) added, the content cannot exceed 5% of the total weight of the defoamer.

Water

Water is not only a carrier, but also a diluent, which can facilitate the pre-dispersion of the defoamer such that the defoamer has a good compatibility in the pulp or coating system, and can reduce the cost, thus having a good economic effectiveness. Water used in the present invention may be water from a clean water source, for example tap water; whether water needs to be pre-treated is not particularly strictly limited.

Preparation of Defoamer Emulsion

In the present invention, the defoamer emulsion is prepared at room temperature with high-speed mechanical stirring, during which a common stirring apparatus may be used, for example, a paddle stirrer or a turbine stirrer.

Generally, for 10 kg of emulsion, the stirring rate is set at about 400 to 1000 rpm, to achieve a better mixing effect. The corresponding stirring rate can be set by persons of skill in the art based on the weight of the emulsion, and can be adjusted according to the variation of the viscosity during the stirring process.

In the present invention, the preparation of the defoamer merely requires a corresponding high-speed stirring device that is common in the prior art, rather than a specialized emulsifying equipment; therefore, compared with other methods for preparing the emulsion defoamer in the prior art, the operation is simple, the equipment cost is correspondingly low, and the prepared defoamer has good antifoaming performances and good product stability.

Oil-in-water Emulsion Defoamer

In the present invention, the "oil-in-water emulsion" is a generic term of mixtures having immiscible two phases, in which an oil (dispersed phase) is dispersed in an aqueous solution (continuous phase).

An oil-in-water emulsion defoamer is prepared by the method according to the present invention, wherein the oil-in-water emulsion defoamer in the present invention has:

an dispersed oil phase with a droplet size (D 0.5) of 4-8 μm;

a viscosity of 100-1000 cP;

a pH value of 6.5-8.0;

an active ingredient with a content of 20-70% of the weight of the defoamer emulsion.

When the dispersed oil phase in the emulsion has an average particle size of 2 μm or below, the viscosity may tend to increase during storage; in contrast, when the dispersed oil phase has a droplet size of 15-20 μm or above, phase separation may occur during storage, which causes demulsification. Therefore, for the oil-in-water emulsion defoamer obtained in the present invention, the parameters in terms of both the droplet size of the oil phase and the viscosity are appropriate.

The defoamer of the present invention is prepared as an emulsion through a method which requires, rather than an emulsifying agent, a particular addition and mixing step, or otherwise, the produced emulsion is unstable.

In the present invention, the key point in the technology for preparing the emulsion with biodiesel is the addition and mixing order of the materials, and a reverse emulsion type is obtained if the order is disrupted.

This formulation has a better defoaming and antifoaming ability compared with the conventional oil-based defoamer. The emulsion thus prepared has good stability and can be stored at room temperature for over half a year. This formulation has defoaming/antifoaming effects in a paper coating process, and also in paper-making recirculating white water.

When the defoamer of the present invention is used in the preparation of a coating, a stock solution thereof is generally directly added. When used in a white water system of a paper machine, on-line dilution is performed at a dilution factor that is indefinite, and is determined based on the on-site foam condition. The defoamer emulsion of the present invention may be used in the entire paper making system, and other manufacturing industries requiring defoaming.

The antifoaming/defoaming performances and stabilities of the defoamer emulsion of the present invention and the conventional oil-based defoamer are compared through specific embodiments below.

EXAMPLES 1, 2, AND 3

Preparation of Defoamer Emulsion of the Present Invention

Components and Contents Thereof in the Defoamer Emulsion
a) 50 parts of fatty acid methyl ester from soybean oil (Soybiodiesel® B 100, manufactured by National Biodiesel Ltd.)
b) 2 parts of dual emulsifying agent as a mixture of Span 60 and Tween 60 at a weight ratio of Tween 60:Span 60=1:2 (Span 60 and Tween 60 supplied by Croda)
c) 2 parts of hydrophobic fumed silica (AEROSIL® R-812, manufactured by Evonik Degussa)
d) 10 parts of polyethylene glycol (PEG600) fatty acid ester (tall oil fatty acid) (Pegosperse 600 DOT, manufactured by LONZA Company)
e) 34 parts of deionized water
f) 1.5 parts of acrylic acid-acrylamide copolymer (PARA-GUM 500, manufactured by Royal Adhesive)
g) 0.5 parts of potassium sorbate as preservative Preparation Process
a) and b) were added to a container A and stirred, and then c) was gradually added and stirred until uniform at a rate suitable for dispersing silica. d) and e) were added in sequence to a container B and stirred at a rate adjusted according to the variation of the viscosity. After the materials in the two containers were stirred to uniform respectively, the materials in the container B were gradually added to the container A, and finally f) and g) were added to obtain a defoamer emulsion A of the present invention.

In Examples 2 and 3, the preparation method above was repeated except that biodiesels derived from two different sources, i.e. fatty acid methyl ester from recycled waste edible oil (Biodiesel, manufactured by Zhejiang Oil Chemical Engineering Co., Ltd.) and fatty acid ethyl ester from soybean oil (manufactured by Anhui Royal Chemical Co., Ltd) were used instead, and other components and the weight ratios were kept unchanged; A defoamer emulsion B and a defoamer emulsion C of the present invention were respectively obtained.

EXAMPLE 4

Preparation of Defoamer Emulsion of the Present Invention

The components and contents thereof in the defoamer emulsion were changed as follows:
a) 50 parts of biodiesel (Biodiesel, manufactured by Zhejiang Oil Chemical Engineering Co., Ltd.)
b) 2 parts of C13 fatty alcohol polyoxyethylene ether (EO=7) as emulsifying agent (MOA7, manufactured by Jiangsu Haian Petroleum Chemical Factory)
c) 2 parts of hydrophobic fumed silica (AEROSIL® R-812, manufactured by Evonik Degussa)
d) 10 parts of polyethylene glycol (PEG400) fatty acid ester (tall oil fatty acid) (PR-475, manufactured by Nalco)
e) 34 parts of deionized water
f) 2 parts of acrylic acid-acrylamide copolymer (PARA-GUM 500, manufactured by Royal Adhesive)
g) 0.5 parts of p-nitrophenol as preservative The preparation process was as described in Example 1, and a defoamer emulsion D of the present invention was obtained.

EXAMPLE 5

Preparation of Defoamer Emulsion of the Present Invention

The components and contents thereof in the defoamer emulsion were changed as follows:
a) 55 parts of biodiesel (Biodiesel, purchased from Zhejiang Oil Chemical Engineering Co., Ltd.)
b) 1 parts of C13 fatty alcohol polyoxyethylene ether (EO=7) as emulsifying agent (MOA7, Jiangsu Haian Petroleum Chemical Factory)
c) 2 parts of hydrophobic fumed silica (AEROSIL® R-812, manufactured by Evonik Degussa)
d) 6 parts of polyethylene glycol (PEG400) fatty acid ester (tall oil fatty acid) (PR-475, manufactured by Nalco)
e) 34 parts of deionized water f) 1.5 parts of acrylic acid-acrylamide copolymer (PARA-GUM 500, manufactured by Royal Adhesive)

g) 0.5 part of sodium benzoate as a preservative

The preparation process was as described in Example 1, and a defoamer emulsion E was obtained.

COMPARATIVE EXAMPLE 1

The components in Example 1 were kept unchanged, except that C) was replaced by hydrophobic precipitated silica.

a) 50 parts of fatty acid methyl ester from soybean oil (Soybiodiesel® B100, purchased from National Biodiesel Ltd.)

b) 2 parts of dual emulsifying agent, where Tween 60:Span60=1:2 (Span 60 and Tween 60 supplied by Croda)

c) 2 parts of hydrophobic precipitated silica (Sipernat D10, purchased from Evonik Degussa)

d) 10 parts of polyethylene glycol (PEG600) fatty acid ester (tall oil fatty acid) (Pegosperse 600 DOT, manufactured by LONZA Company)

e) 34 parts of deionized water f) 1.5 parts of thickener (Selvol 09-523, manufactured by Sekisui Chemilc)

g) 0.5 parts of benzoisothiazolinone as a bactericidal agent a) and b) were added to a container A and stirred, and then c) was gradually added and stirred until uniform at a rate suitable for dispersing silica. d) and e) were added to a container B and stirred at a rate adjusted according to the variation of the viscosity. After the materials in the two containers were stirred to uniform respectively, the materials in the container B were gradually added to the container A and stirred at a high speed maintained at 500-1000 rpm, and finally f) and g) were added to obtain a defoamer product F.

COMPARATIVE EXAMPLE 2

The components and contents thereof in the defoamer in Example 1 were kept unchanged, but the addition order of the raw materials was changed in the preparation process.

a) and b) were added to a container A and stirred, and then c) was gradually added and stirred until uniform at a rate suitable for dispersing silica. After being mixed uniformly, d) was added and stirred until uniform, then e) was added and stirred at a high speed for emulsification, and finally f) and g) were added, to obtain a defoamer product G.

Stability Evaluation

The properties of the emulsions of Examples 1-5 and Comparative Examples 1-2 were measured by the methods described below, which are summaried in Table 1.

The type of the emulsions is determined by a conductivity meter. Conductivity is numerical representation of the ability of a solution to conduct an electric current. When the conductivity is zero at room temperature, the emulsion is a water-in-oil emulsion, and when the conductivity is greater than zero, the emulsion is an oil-in-water emulsion.

The viscosity is measured by a Brookfield viscometer (fitted with a #63 rotor) at a rotation rate of 30 rpm.

The particle size of the emulsion is measured by Malvern Mastersizer 2000, and the value of the particle size (D 0.5) is taken as an measuring criteria.

TABLE 1

| Example | Defoamer No. | Emulsion type | Viscosity (cP) | Particle size, D 0.5 (μm) | Time to phase separation (at room temperature) |
|---|---|---|---|---|---|
| Example 1 | A | Oil-in-water | 350 | 4.2 | Week 22 |
| Example 2 | B | Oil-in-water | 310 | 3.6 | Week 21 |
| Example 3 | C | Oil-in-water | 620 | 3.4 | Week 22 |
| Example 4 | D | Oil-in-water | 550 | 4.8 | Week 22 |
| Example 5 | E | Oil-in-water | 480 | 5.3 | Week 23 |
| Comparative Example 1 | F | Water-in-oil | 305 | not detectable | Week 1 |
| Comparative Example 2 | G | Water-in-oil | 340 | not detectable | Week 2 |

It can be seen from the data shown in Table 1 that a stable oil-in-water emulsion can be prepared by the method of the present invention. In Comparative Examples 1 and 2, a water-in-oil emulsion having an extremely poor stability is obtained.

EVALUATION OF COATING DENSITY AND COMPATIBILITY (COMPARATIVE EXAMPLES 3 AND 4)

The defoamer emulsion of the present invention may be used as a defoaming/antifoaming agent for paper coating in a paper mill. In the performance evaluation below, the selected paper coatings are respectively styrene-butadiene latex (SB latex) and styrene-acrylate latex (SA latex).

The antifoaming performances of the defoamer emulsions prepared in Examples 1, 4, and 5 of the present invention when used in paper coatings of two different latex types are evaluated respectively below.

In Comparative Examples 3, a control defoamer product I (Nalco 8669plus) with petroleum hydrocarbons as the principal ingredient is used, in which the content of the active ingredient is 90%. In Comparative Example 4, a fatty alcohol emulsion-type control defoamer product J (Nalco 74192) is used, in which the content of the active ingredient is 30%. These two types of products are defoamers commonly used in paper mill. In the defoamer sample of the present invention, the content of the active ingredient is 62%.

The coating density is tested as follows: although the defoamer product of the present invention has an active content different from that of the comparative Example, the amount of the defoamer added is taken as a uniform standard for convenience of calculation. The amount of the defoamer product added is such that the defoamer dosage based on coating wet weight is in the range of 0 to 500 ppm, with the 5 additions leading to a concentration of 100 ppm, 200 ppm, 300 ppm, 400 ppm, and 500 ppm respectively. The coating generate foams after shaking with an shaker for 10 min at 300 rpm, and then the coating density is immediately measured by a dedicated density cup. The density of a blank coating without the defoamer is determined through the same method. The higher the coating density, the lower the air content, and the better the antifoaming/defoaming performance of the defoamer.

Figure 1:
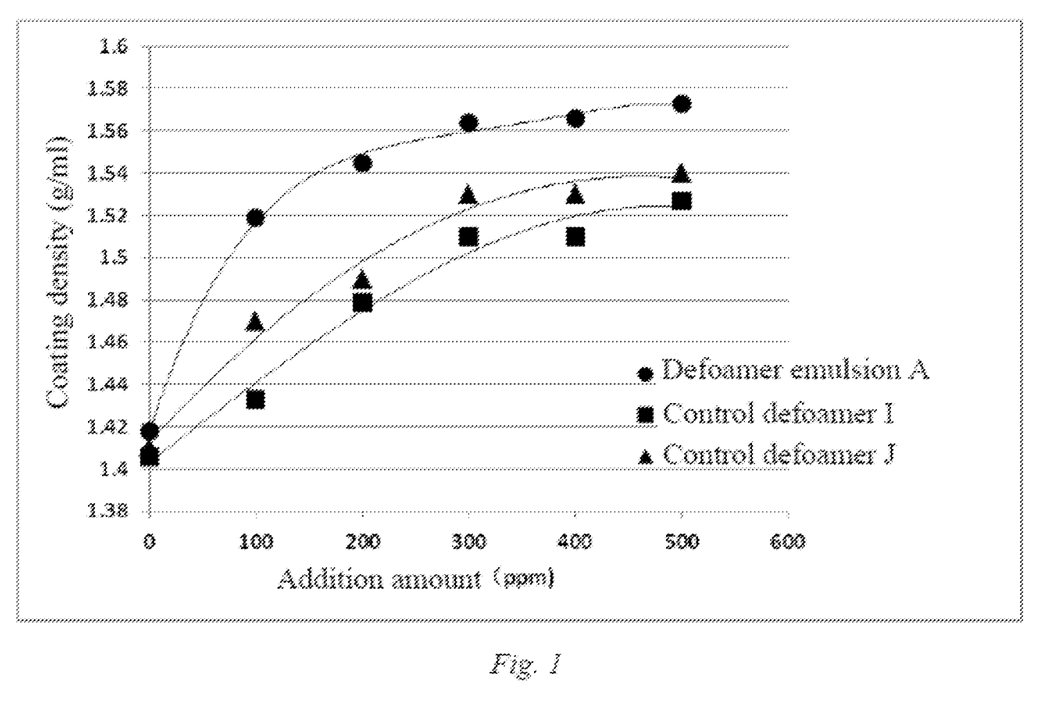
FIG. 1 is a schematic diagram of the coating density detected when a defoamer prepared according to an embodiment of the present invention is used as an antifoam of a coating vs the coating density of a comparative embodiment.

FIG. 1 shows the coating densities obtained with the defoamer emulsion product A of Example 1, and with the control defoamers I and J used in Comparative Example 3 and 4. The experimental results are based on the experiments with SA latex.

The compatibility is tested by adding 300 ppm of the defoamer products to a coating sample respectively, uniformly mixing, and then coating on a glass plate by a specialized coating blade. After the coating is dry, the planarity of the coating surface is observed, the number of the repelling holes, if any, is recorded, and the lower the number of the repelling holes, the better the compatibility.

Table 2 shows the compatibility, in which "excellent" denotes 0-4 repelling holes, "good" denotes 5-8 repelling holes, and "poor" denotes more than 8 repelling holes. Meanwhile, in Table 2, the average coating density value (g/mL) of parallel experiments is taken as anmeasuring criteria, and the performances of the defoamers at 300 ppm are listed for comparison.

TABLE 2

| Example | Defoamer No. | Defoaming performance (density) | | Compatibility | |
|---|---|---|---|---|---|
| | | SB latex | SA latex | SB latex | SA latex |
| Example 1 | A | 1.61 | 1.58 | Excellent | Excellent |
| Example 4 | D | 1.64 | 1.60 | Excellent | Excellent |
| Example 5 | E | 1.61 | 1.57 | Excellent | Excellent |
| Comparative Example 3 | I | 1.53 | 1.51 | Good | Good |
| Comparative Example 4 | J | 1.49 | 1.53 | Excellent | Good |
| Blank Control | — | 1.41 | 1.44 | Excellent | Excellent |

The data in Table 2 suggest that the defoamer of the present invention has an antifoaming/defoaming performance better than that of Comparative Examples 3 and 4, while maintaining a good compatibility.

Evaluation of Wet-end Antifoaming/defoaming Performance in Paper Making

The defoamer of the present invention may be used for wet-end defoaming/antifoaming in a paper mill. The corresponding antifoaming/antifoaming performance is evaluated below. Hereinafter, specific Examples for performance evaluation are given.

The defoaming/antifoaming performance was tested by means of a circulating foam cell, with white water from paper mill as a foaming medium. The foaming medium was heated to the system temperature of the paper mill, that is, about 55° C., and then added in a foam cell with scale to 15 centermeters. The circulating pump was activated for bubbling to 30 centermeters, then 5 μL of a defoamer sample was added, the variation of foam height with time was recorded, including the foam "knock down" point (lowest foam height), and the variation of the foam with time after rebubbling. The lower the knock down point, the better the defoaming performance of the defoamer; and the slower the rise of the foam over time after rebubbling, the better the antifoaming performance of the defoamer.

White water used in this experiment was from a paper board mill having serious foaming problem, and two different pulps including a recycled OCC paper pulp and a raw unbleached wood pulp were tested.

The defoamer emulsions A, B, C, D, and E of the present invention have similar results, and merely the results obtained with the defoamer emulsion A, and the comparison with the control defoamers I and J are shown in Table 3.

Figure 2:
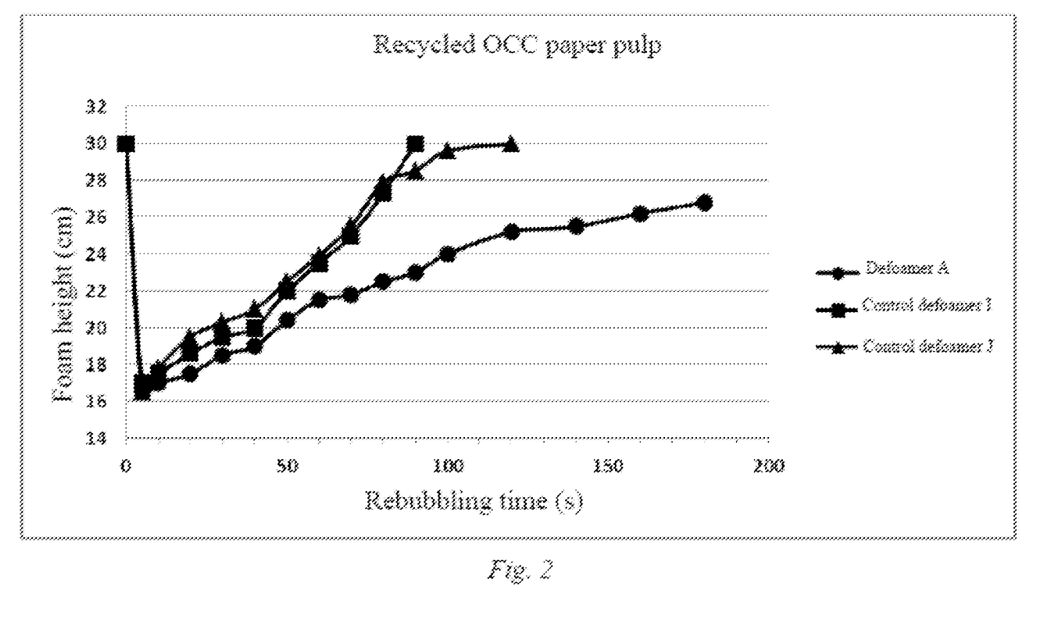
FIG. 2 is a schematic diagram of the defoaming performances of a defoamer prepared according to an embodiment of the present invention used for wet-end defoaming of old corrugated container (OCC) paper pulp in a paper board mill vs a comparative embodiment.
Figure 3:
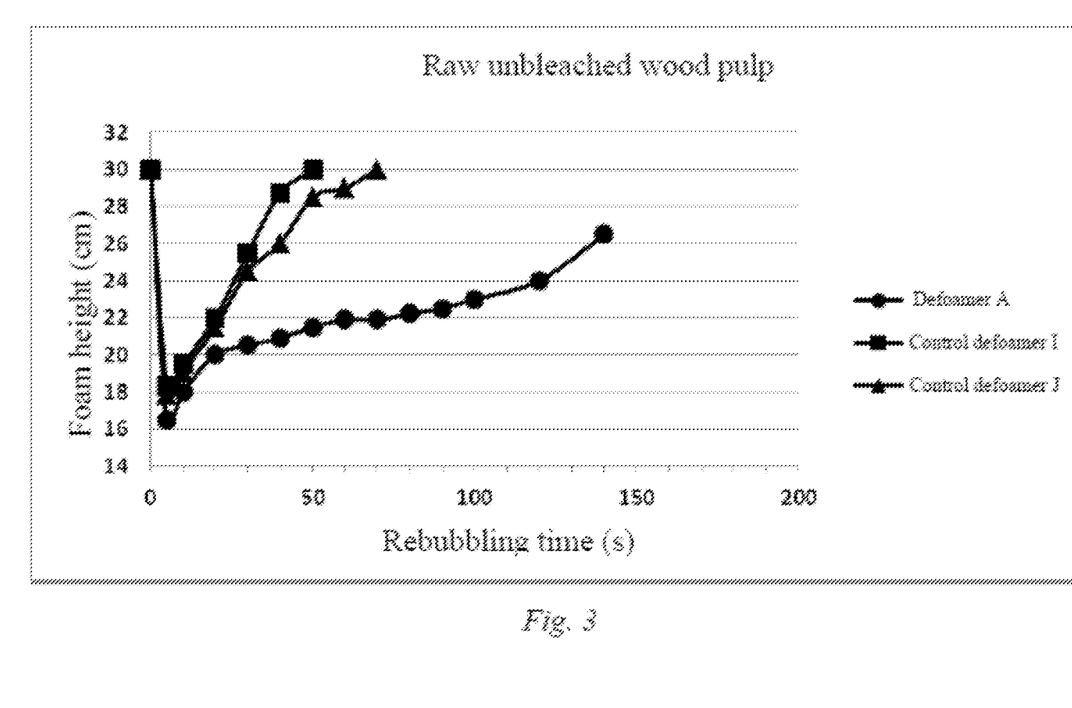
FIG. 3 is a schematic diagram of the defoaming performances of a defoamer prepared according to an embodiment of the present invention used for wet-end defoaming of virgin unbleached wood pulp in a paper board mill vs a comparative embodiment.

The data in Table 3 suggest that the defoamer emulsion of the present invention has a more powerful defoaming and antifoaming ability compared with the reference defoamer products, and reference may be made to FIGS. 2 and 3 for clearer comparison results.

TABLE 3

| | Recycled OCC paper pulp Foam height (cm) | | | Raw unbleached wood pulp Foam height (cm) | | |
|---|---|---|---|---|---|---|
| Time (s) | Defoamer A | Control Defoamer I | Control Defoamer J | Defoamer A | Control Defoamer I | Control Defoamer J |
| 0 | 30 | 30 | 30 | 30 | 30 | 30 |
| 5 | 16.5 | 17 | 16.5 | 16.5 | 18.3 | 17.8 |
| 10 | 17 | 17.5 | 17.8 | 18 | 19.5 | 19.1 |
| 20 | 17.5 | 18.6 | 19.5 | 20 | 22 | 21.5 |
| 30 | 18.5 | 19.5 | 20.3 | 20.5 | 25.5 | 24.5 |
| 40 | 19 | 20 | 21 | 20.9 | 28.7 | 26 |
| 50 | 20.4 | 22 | 22.5 | 21.5 | 30 | 28.5 |
| 60 | 21.5 | 23.5 | 23.9 | 21.9 | — | 29 |
| 70 | 21.8 | 25 | 25.5 | 21.9 | — | 30 |
| 80 | 22.5 | 27.3 | 27.9 | 22.2 | — | — |
| 90 | 23 | 30 | 28.5 | 22.5 | — | — |
| 100 | 24 | — | 29.6 | 23 | — | — |
| 120 | 25.2 | — | 30 | 24 | — | — |
| 140 | 25.5 | — | — | 26.5 | — | — |
| 160 | 26.2 | — | — | — | — | — |
| 180 | 26.8 | — | — | — | — | — |

According to the embodiments of the present invention, a method for preparing a new defoamer is provided, by preparing an oil-in-water emulsion defoamer with biodiesel as an oil phase; the defoamer is useful for defoaming in paper coating and wet-end in a paper mill, and has excellent stability while maintaining the antifoaming and defoaming performances. Moreover, the defoamer of the present invention is also suitable for a process that is required to be highly environmentally friendly, and the production process is simple, thereby meeting the demands of the prior art.

Numerous embodiments are disclosed for exemplarily describing the present invention; however, other embodiments of the present invention will be apparent to those skilled in the art from the detailed description of the present invention above; variations and modifications made by persons of skill in the art based on the disclosure of the present invention will fall within the protective scope of the present invention.

The invention claimed is:

1. A method for preparing an oil-in-water emulsion defoamer, comprising the steps of:
    adding 0.2 to 6 weight parts of an emulsifying agent to 30 to 60 weight parts of biodiesel, and mixing, then gradually adding 0.5 to 3 weight parts of hydrophobic fumed silica, and thoroughly stirring to disperse said silica, to obtain a mixture A;
    (ii) gradually adding 10 to 50 weight parts of water to 5 to 30 weight parts of a non-ionic surfactant, and stirring until uniform at a stirring rate adjusted according to the variation of the viscosity of the resulting mixture, to obtain a mixture B, wherein said non-ionic surfactant has a cloud point of below 50° C.; and then
    (iii) gradually adding the mixture A to the mixture B, and stirring until uniform to obtain said oil-in-water emulsion defoamer, wherein the weight parts are based on the oil-in-water emulsion defoamer.

2. The method according to claim 1, characterized in that said hydrophobic fumed silica has a specific surface area ranging from 200 to 300 m$^2$/g.

3. The method according to claim 1, characterized in that said emulsifying agent is a non-ionic surfactant having a hydrophilic-lipophilic balance (HLB) value of 8 to 18.

4. The method according to claim 3, characterized in that said emulsifying agent is one or any combination of two or more selected from a fatty alcohol-polyoxyethylene ether, an alkyl phenyl polyoxyethylene ether, an ethoxylated fatty acid amide, a sorbitan fatty acid ester, and an ethoxylated sorbitol fatty acid ester.

5. The method according to claim 4, characterized in that, said emulsifying agent is a mixture of a sorbitan fatty acid ester and an ethoxylated sorbitol fatty acid ester.

6. The method according to claim 1, characterized in that said non-ionic surfactant is selected from a polyethylene glycol fatty acid ester, a polyethylene glycol tall oil acid ester, a polyether polyol , and a fatty alcohol polyether.

7. The method according to claim 6, characterized in that said polyethylene glycol fatty acid ester is selected from the group consisting of a polyethylene glycol (400) fatty acid ester, a polyethylene glycol (600) fatty acid ester, and any combination thereof.

8. The method according to claim 7, characterized in that said polyethylene glycol fatty acid ester has a di- or mono-ester structure, or is a mixture thereof.

9. The method according to claim 7, characterized in that in said polyethylene glycol fatty acid ester, the fatty acid is a saturated or unsaturated fatty acid having 12 to 18 carbon atoms.

10. The method according to claim 6, characterized in that said polyethylene glycol tall oil acid ester is polyethylene glycol (400) tall oil acid ester, polyethylene glycol (600) tall oil acid ester, or any combination thereof.

11. The method according to claim 6, characterized in that said polyetherpolyol is an ethylene oxide-propylene oxide polymer prepared with a polyhydric compound as an initiator, the addition amount of the ethylene oxide accounting for 10 to 40% of the total weight of the polyether polyol.

12. The method according to claim 6, characterized in that said fatty alcohol polyether is an addition product prepared by reacting a fatty alcohol having 10 to 16 carbon atoms with either ethylene oxide or a mixture, the mixture comprising ethylene oxide and propylene oxide.

13. The method according to claim 1, characterized in that said biodiesel is a mixture containing a fatty acid methyl ester, a fatty acid ethyl ester, or both, with the content of the active ingredient being 90% or above.

14. The method according to claim 13, characterized in that said biodiesel has a flash point of 100° C. or above.

15. The method according to claim 1, characterized in that an auxiliary is optionally added before Step (iii) is completed, wherein a total content of the auxiliary is in the range of 0.01% to 2%, based on a total weight of the defoamer, wherein said auxiliary comprises a member selected from the group consisting of a defoam promoter, an antimicrobial agent, a thickener, a pH modifier, and any combination thereof.

16. The method according to claim 15, characterized in that said defoam promoter is one or more selected from a polyether modified polydimethylsiloxane, a polyether polyol, or a short-chain fatty alcohol, wherein said polyether modified polydimethylsiloxane has a cloud point ranging from 20° C. to 50° C., and a viscosity of 3400 cP or below; said polyether polyol is an ethylene oxide-propylene oxide polymer prepared with a ployhydric compound as initiator; and said short-chain fatty alcohol is a linear or branched fatty alcohol having 8 to 16 carbon atoms.

17. The method according to claim 15, characterized in that said antimicrobial agent comprises a preservative and a bactericidal agent, wherein the preservative is one or more selected from 2-hydroxybiphenyl, sorbic acid and a salt thereof, benzoic acid and a salt thereof, benzaldehyde, p-hydroxybenzaldehyde, p-nitrophenol, p- hydroxybenzoic acid and an ester compound thereof, and the bactericidal agent is one or more selected from a quaternary ammonium salt type bactericidal agent, a chloride type bactericidal agent, a peroxide type bactericidal agent, an azoline type bactericidal agent, and an aldehyde type bactericidal agent.

* * * * *

UNITED STATES PATENT AND TRADEMARK OFFICE
CERTIFICATE OF CORRECTION

PATENT NO. : 10,005,007 B2
APPLICATION NO. : 14/786501
DATED : June 26, 2018
INVENTOR(S) : Yanru Fan et al.

Page 1 of 1

It is certified that error appears in the above-identified patent and that said Letters Patent is hereby corrected as shown below:

In the Claims

Column 15, Claim 1, Line 12, before "adding" insert -- (i) --.

Column 15, Claim 6, Line 45, delete "polyol ," and insert -- polyol, --, therefor.

Column 16, Claim 11, Line 10, delete "polyetherpolyol" and insert -- polyether polyol --, therefor.

Column 16, Claim 16, Line 38, delete "ployhydric" and insert -- polyhydric --, therefor.

Column 16, Claim 17, Line 46, delete "p- hydroxybenzoic" and insert -- p-hydroxybenzoic --, therefor.

Signed and Sealed this
Seventh Day of May, 2019

Andrei Iancu
*Director of the United States Patent and Trademark Office*